(12) United States Patent
Djukic et al.

(10) Patent No.: US 12,557,002 B2
(45) Date of Patent: Feb. 17, 2026

(54) ASSIGNING USER PLANE FUNCTIONS (UPFS) WITHIN A 5G CORE NETWORK

(71) Applicant: Ciena Corporation, Hanover, MD (US)

(72) Inventors: Petar Djukic, Ottawa (CA); Yeshu Wu, Ottawa (CA); Todd Morris, Stittsville (CA)

(73) Assignee: Ciena Corporation, Hanover, MD (US)

( * ) Notice: Subject to any disclaimer, the term of this patent is extended or adjusted under 35 U.S.C. 154(b) by 336 days.

(21) Appl. No.: 18/342,410

(22) Filed: Jun. 27, 2023

(65) Prior Publication Data

US 2025/0008410 A1   Jan. 2, 2025

(51) Int. Cl.
*H04W 40/24* (2009.01)

(52) U.S. Cl.
CPC .................................. *H04W 40/246* (2013.01)

(58) Field of Classification Search
CPC ............................. H04W 40/246; H04L 45/48
USPC ......................................................... 370/254
See application file for complete search history.

(56) References Cited

U.S. PATENT DOCUMENTS

| | | | |
|---|---|---|---|
| 8,477,679 B2 | 7/2013 | Sharifian et al. | |
| 8,887,217 B2 | 11/2014 | Salem et al. | |
| 9,060,292 B2 | 6/2015 | Callard et al. | |
| 9,407,475 B2 * | 8/2016 | Kaplan | H04L 25/03242 |
| 9,432,257 B2 | 8/2016 | Li et al. | |
| 9,819,565 B2 | 11/2017 | Djukic et al. | |
| 9,832,681 B2 | 11/2017 | Callard et al. | |
| 9,838,296 B2 | 12/2017 | Armolavicius et al. | |
| 9,980,284 B2 | 5/2018 | Djukic et al. | |
| 10,015,057 B2 | 7/2018 | Djukic et al. | |
| 10,028,302 B2 | 7/2018 | Au et al. | |
| 10,034,222 B2 | 7/2018 | Zhang et al. | |
| 10,069,570 B2 | 9/2018 | Djukic et al. | |
| 10,148,578 B2 | 12/2018 | Morris et al. | |
| 10,153,869 B2 | 12/2018 | Djukic et al. | |
| 10,333,779 B2 | 6/2019 | Djukic et al. | |
| 10,390,348 B2 | 8/2019 | Zhang et al. | |

(Continued)

FOREIGN PATENT DOCUMENTS

| | | |
|---|---|---|
| EP | 3090517 B1 | 1/2018 |
| EP | 3069483 B1 | 7/2019 |

(Continued)

*Primary Examiner* — Kwang B Yao
*Assistant Examiner* — Syed M Bokhari
(74) *Attorney, Agent, or Firm* — Baratta Law PLLC; Lawrence A. Baratta, Jr.

(57) ABSTRACT

Systems and methods are provided for placement of User Plane Functions (UPFs) on one or more nodes and assigning Distributed Units (DUs) to the UPF-hosting nodes of a 5G network slice. A method, according to one implementation, includes the step of obtaining a network topology map portraying a network that includes at least a plurality of components of a Radio Access Network (RAN) and a plurality of eligible nodes capable of connecting the components to the Internet. The method also includes the step of creating a tree graph from the network topology map. The tree graph includes a plurality of branches, where each branch represents the lowest cost path between a respective eligible node and a selected one of the plurality of components. In addition, the method includes selecting a group of the eligible nodes that collectively are capable of connecting the plurality of components to the Internet.

20 Claims, 8 Drawing Sheets

(56) References Cited

U.S. PATENT DOCUMENTS

| | | |
|---|---|---|
| 10,491,501 B2 | 11/2019 | Armolavicius et al. |
| 10,623,277 B2 | 4/2020 | Djukic et al. |
| 10,631,179 B2 | 4/2020 | Djukic et al. |
| 10,644,941 B2 | 5/2020 | Djukic et al. |
| 10,862,771 B2 | 12/2020 | Tomkins et al. |
| 11,057,495 B2 | 7/2021 | Fedorov et al. |
| 11,153,229 B2 | 10/2021 | Djukic et al. |
| 11,316,755 B2 | 4/2022 | Djukic et al. |
| 11,356,174 B1 | 6/2022 | Golaghazadeh et al. |
| 11,356,320 B2 | 6/2022 | Côte et al. |
| 11,620,528 B2 | 4/2023 | Ryan et al. |
| 11,909,627 B2 * | 2/2024 | Akhavain Mohammadi ............... H04L 45/48 |
| 12,170,946 B2 * | 12/2024 | Wei ........................ H04W 40/04 |
| 2012/0039161 A1 * | 2/2012 | Allan ....................... H04L 45/28 370/216 |
| 2014/0219104 A1 * | 8/2014 | Senarath ............ H04W 28/0268 370/238 |
| 2014/0229210 A1 | 8/2014 | Sharifian et al. |
| 2015/0032871 A1 * | 1/2015 | Allan ..................... H04L 47/125 709/223 |
| 2016/0029432 A1 | 1/2016 | Sun et al. |
| 2017/0163337 A1 | 6/2017 | Djukic et al. |
| 2018/0242310 A1 | 8/2018 | Au et al. |
| 2018/0262924 A1 * | 9/2018 | Dao .................... H04W 72/535 |
| 2019/0230046 A1 | 7/2019 | Djukic et al. |
| 2019/0379589 A1 | 12/2019 | Ryan et al. |
| 2020/0067935 A1 | 2/2020 | Carnes, III et al. |
| 2020/0387797 A1 | 12/2020 | Ryan et al. |
| 2021/0303969 A1 | 9/2021 | Amiri et al. |
| 2022/0263842 A1 | 8/2022 | Chen et al. |
| 2022/0272100 A1 | 8/2022 | Carnes, III et al. |
| 2022/0330027 A1 | 10/2022 | Djukic et al. |
| 2022/0407597 A1 | 12/2022 | Amiri et al. |
| 2023/0022401 A1 | 1/2023 | Amiri et al. |
| 2023/0026370 A1 | 1/2023 | Amiri et al. |
| 2023/0057444 A1 | 2/2023 | Djukic et al. |
| 2023/0224218 A1 * | 7/2023 | Takano ................ H04W 24/08 370/252 |
| 2023/0388871 A1 * | 11/2023 | Guo .................. H04W 36/0069 |
| 2024/0022927 A1 * | 1/2024 | Tong ...................... H04W 4/40 |

FOREIGN PATENT DOCUMENTS

| | | |
|---|---|---|
| EP | 3092779 B1 | 11/2019 |
| EP | 2959622 B1 | 11/2020 |
| WO | 2011134305 A1 | 11/2011 |
| WO | 2016045487 A1 | 3/2016 |
| WO | 2021045964 A1 | 3/2021 |
| WO | 2022271521 A1 | 12/2022 |

* cited by examiner

ASSIGNING USER PLANE FUNCTIONS (UPFS) WITHIN A 5G CORE NETWORK

TECHNICAL FIELD

The present disclosure generally relates to networking systems and methods. More particularly, the present disclosure relates to placing User Plane Functions (UPFs) on eligible nodes in a 5G core network and assigning the UPF nodes to Distributed Units (DUs) of a 5G Radio Access Network (5G RAN).

BACKGROUND

Generally, a fifth generation (5G) Radio Access Network (RAN) includes a next generation NodeB (i.e., gNB or gNodeB), New Radio (NR), Baseband Unit (BBU), or other suitable infrastructure. The gNB, for example, may functionally be equivalent to a base station of a cellular network and is responsible for radio communications within its coverage area (or cell). Physically, the gNB may be a cellular tower. Virtually, the gNB may be a Software Defined Radio (SDR). In addition to the gNB, the typical 5G RAN also includes a Centralized Unit (CU) and a plurality of Distributed Units (DUs). The CU is configured to implement RAN Media Access Control (MAC) protocols and is normally connected to multiple DUs. The DUs, in turn, include wireless radios for communication with user devices, such as mobile devices or other User Equipment (UE). A 5G Core Network (CN), operating in conjunction with the 5G RAN, may include, for example, User Plane Functions (UPFs), Access and mobility Management Functions (AMFs), and Session Management Functions (SMFs). The UPFs, AMFs, and SMFs may be implemented as Virtualized Network Functions (VNFs) in the 5G CN. The UPF service, for example, may be configured to translate 5G CN radio-based traffic into regular Internet Protocol (IP) network traffic and thereby allows the UE to connect to the Internet from the 5G network.

BRIEF SUMMARY

The present disclosure is directed to systems and methods for placing User Plane Functions (UPFs) on eligible nodes of a 5G network slice and assigning Distributed Units (DUs) to these nodes on which the UPFs are placed. In one implementation, a method includes the step of obtaining a network topology map portraying a network that includes a plurality of components of a Radio Access Network (RAN) and a plurality of eligible nodes capable of connecting the components to the Internet. The method also includes creating a tree graph from the network topology map, where the tree graph includes a plurality of branches, and where each branch represents a lowest cost path between a respective eligible node and a selected one of the plurality of components. Also, the method includes selecting a group of the eligible nodes that collectively are capable of connecting the plurality of components to the Internet.

Furthermore, according to some implementations, the method may include additional steps. From a plurality of nodes of one or more data network domains connected between the RAN and Internet, the method may include the step of determining which nodes have sufficient capacity to host a User Plane Function (UPF) for enabling connection to the Internet. From the network topology map, the method may also include the step of determining link costs of each of a plurality of communication links in the network topology. The method may also include the step of pruning one or more of the plurality of branches of the tree graph that violate a rule associated with a predetermined maximum path cost. The method may further include the step of assigning each component of the RAN to a node selected from the group of eligible nodes. For example, the eligible nodes may be part of a 5G core network, and the components of the RAN include at least a Centralized Unit (CUs) and one or more Distributed Units (DUs).

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1A:
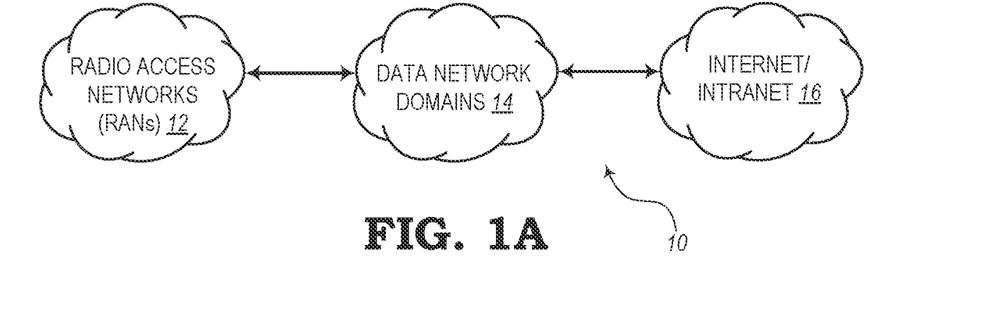
FIGS. 1A and 1B are diagrams illustrating embodiments of communications networks configured to enable components of multiple Radio Access Network (RANs) to connect to the Internet.

FIG. 1A is a diagram illustrating an embodiment of a network 10. As illustrated, the network 10 includes multiple Radio Access Networks (RANs) 12, multiple data network domains 14, and a Wide Area Network (WAN) (referred to herein as Internet/Intranet 16). The network 10 is configured to enable components (e.g., Centralized Units (CUs), Distributed Units (DUs), etc.) of the RANs 12 to connect to the Internet/Intranet 16 via the data network domains 14.

Figure 1B:
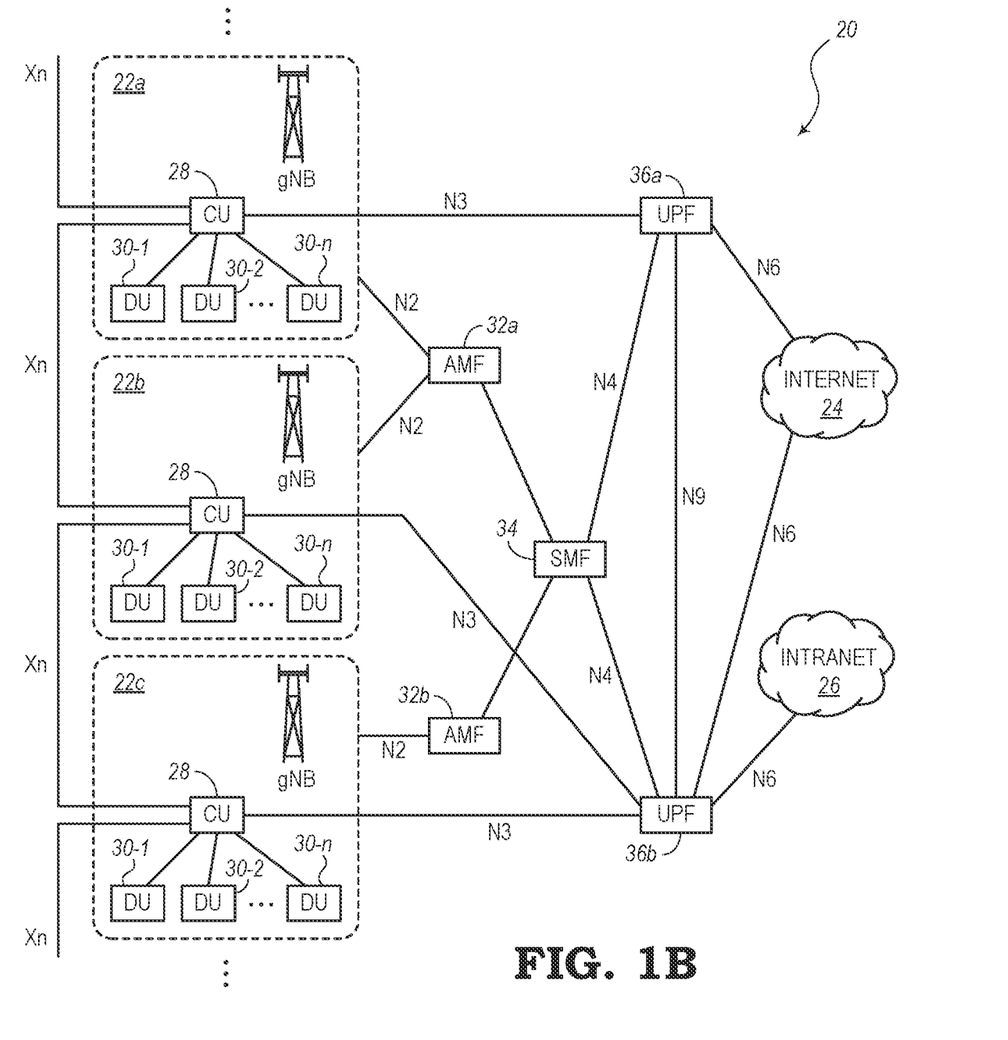

FIG. 1B is a diagram illustrating an embodiment of another network 20 configured to enable components of multiple RANs 22a, 22b, 22c, . . . (e.g., RANs 12) to connect to the Internet 24 and/or Intranet 26 (e.g., Internet/Intranet 16). Each RAN 22 includes a CU 28 connected to multiple DUs 30-1, 30-2, . . . , 30-n. The CUs 28 in adjacent RANs (e.g., 22a and 22b) may be connected together to enable a handover (Xn) procedure when a user travels from one cell to another.

The network 20 includes a 5G Core Network (5G CN), which may include one or more data network domains (e.g., data network domains 14). As illustrated in the embodiment of FIG. 1B, the 5G CN includes Access and mobility Management Functions (AMFs) 32a, 32b, a Session Management Function (SMF) 34, and User Plane Functions (UPFs) 36a, 36b. The AMFs 32, SMF 34, and UPFs 36 may be hosted on nodes of the 5G CN and are configured to perform various Virtualized Network Functions (VNFs). The RANs 22 are configured to be connected to the nodes associated with the AMFs via N2 interfaces. The CUs 28 are configured to be connected to the nodes associated with the UPFs 36 via N3 interfaces. The nodes associated with the SMFs 34 are configured to be connected to the nodes associated with the UPFs 36 via N4 interfaces. The nodes associated with the UPFs 36 are configured to be connected to the Internet 24 or Intranet 26 via N6 interfaces. Also, the UPFs 36 are configured to be connected to each other via N9 interfaces.

The systems and methods of the present disclosure are configured to address the issue of placing the functionality of the UPFs 36 into suitable service nodes of the 5G CN and then assigning each CU 28 in the 5G RANs 22 to suitable UPF 36 service nodes. As mentioned above, a UPF service is configured to translate CN (radio) traffic into regular network traffic. Hence, this translation process allows User Equipment (UE) (not shown), which may be wirelessly connected with one or more DUs 30, to access the Internet 24 or Intranet 26 through the 5G network. The 5G networks are meant to support multiple classes of services, which may be distinguished by their latency requirements. In particular, in some scenarios, a large portion of the latency budget may come from the physical characteristics (e.g., latency, hop distance, etc.) between a CU 28 (or DU 30) and a UPF 36.

The network functionality associated with the CUs 28, DUs 30, AMFs 32, SMFs 34, UPFs 36, etc. may be implemented as VNFs in the communications network 20. A network operator or network administrator generally has the freedom to instantiate these functions in general-purpose nodes, computing devices, data centers, etc. By selecting the location of where their VNFs are instantiated, the network operator can effectively control the network latency experienced by users at different locations. From an optimization perspective, this procedure may be referred to as a network embedding solution, in which one network (e.g., 5G CN) may be embedded within another network (e.g., data centers connected with network links).

It may be noted that the network 20 as shown in FIG. 1B depicts a simplified system having a small number of RANs 22 and a small number of nodes connected between the RANs 22 and the Internet 24 and Intranet 26. However, in reality, a network may include dozens, hundreds, or even thousands of intermediate nodes. The solutions described in the present disclosure may be configured to accommodate a network of any size and may be scaled using parallel processing as necessary to handle any network, even when it expands. For example, a database built for the present disclosure was shown to be very scalable.

Therefore, one goal of the present disclosure may be to find a minimum number of UPFs to cover the designated DUs. The procedures for determining the minimized number of UPF nodes may be performed regardless of UPF connectivity, resiliency, CU placement, N9 interfaces, and involvement of a control plane. In some embodiments, the UPF placement techniques described herein may be incorporated in related software and hardware products, such as those involving service orchestration, service fulfillment, service assurance, network planning, etc. Thus, the UPF placement techniques of the present disclosure may be configured to orchestrate 5G network slices (or domains). The systems and methods of the present disclosure are configured to provide solutions for controlling UPF placement and assignment in a quick and scalable manner, while also producing flexibility to allow the network operator to choose certain options for customizing the 5G network as desired.

Figure 2:
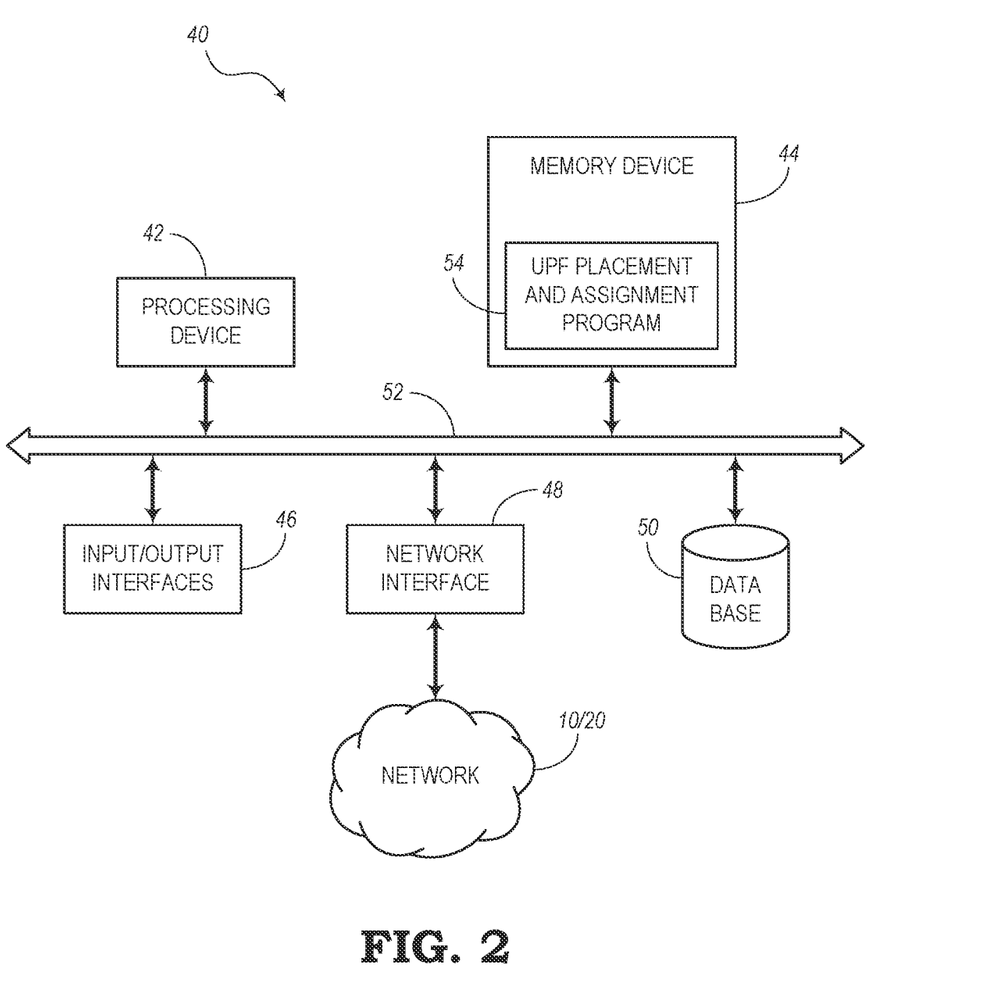
FIG. 2 is a block diagram illustrating an embodiment of a computing device configured to control the placement of User Plane Functions (UPFs) on eligible nodes and assign the UPF nodes to Distributed Units (DUs) of a RAN.

FIG. 2 is a block diagram illustrating an embodiment of a computing device 40 configured to control the placement of UPFs on eligible nodes and assign the UPF nodes to DUs (e.g., DUs 30) of a RAN (e.g., RAN 22). In the illustrated embodiment, the computing device 40 may be a digital computing device that generally includes a processing device 42, a memory device 44, Input/Output (I/O) interfaces 46, a network interface 48, and a database 50. It should be appreciated that FIG. 2 depicts the computing device 40 in a simplified manner, where some embodiments may include additional components and suitably configured processing logic to support known or conventional operating features. The components (i.e., 42, 44, 46, 48, 50) may be communicatively coupled via a local interface 52. The local interface 52 may include, for example, one or more buses or other wired or wireless connections. The local interface 52 may also include controllers, buffers, caches, drivers, repeaters, receivers, among other elements, to enable communication. Further, the local interface 52 may include address, control, and/or data connections to enable appropriate communications among the components 42, 44, 46, 48, 50.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

The computing device 40 may be configured in a control plane associated with a network (e.g., network 10, 20). The network interface 48 may be configured to communicate with the network 10, 20 as needed for providing control signals for installing the UPFs on suitable nodes as needed and in accordance with the techniques described herein. Also, the computing device 40 is configured to assign each of the DUs 30 in one or more 5G network slices to the nodes embedded with the functionality of the strategically placed UPFs.

In particular, the computing device 40 includes a UPF placement and assignment program 54, which may be implemented in any suitable combination of hardware (e.g., in the processing device 42) and/or software or firmware (e.g., in the memory device 44). The UPF placement and assignment program 54 may include computer logic, functionality, logical code, commands, instructions, etc. for enabling or causing the processing device 42 to perform certain functionality related the strategic placement of UPF or other associated functionality in a group of intermediate nodes for enabling 5G-based devices to access the Internet. Also, the UPF placement and assignment program 54 is configured to enable or cause the processing device 42 to assign the DUs to the "closest" UPF nodes, whereby the "closeness" variable may be related to the lowest latency along a certain path between the DU and the UPF node.

Figure 3:
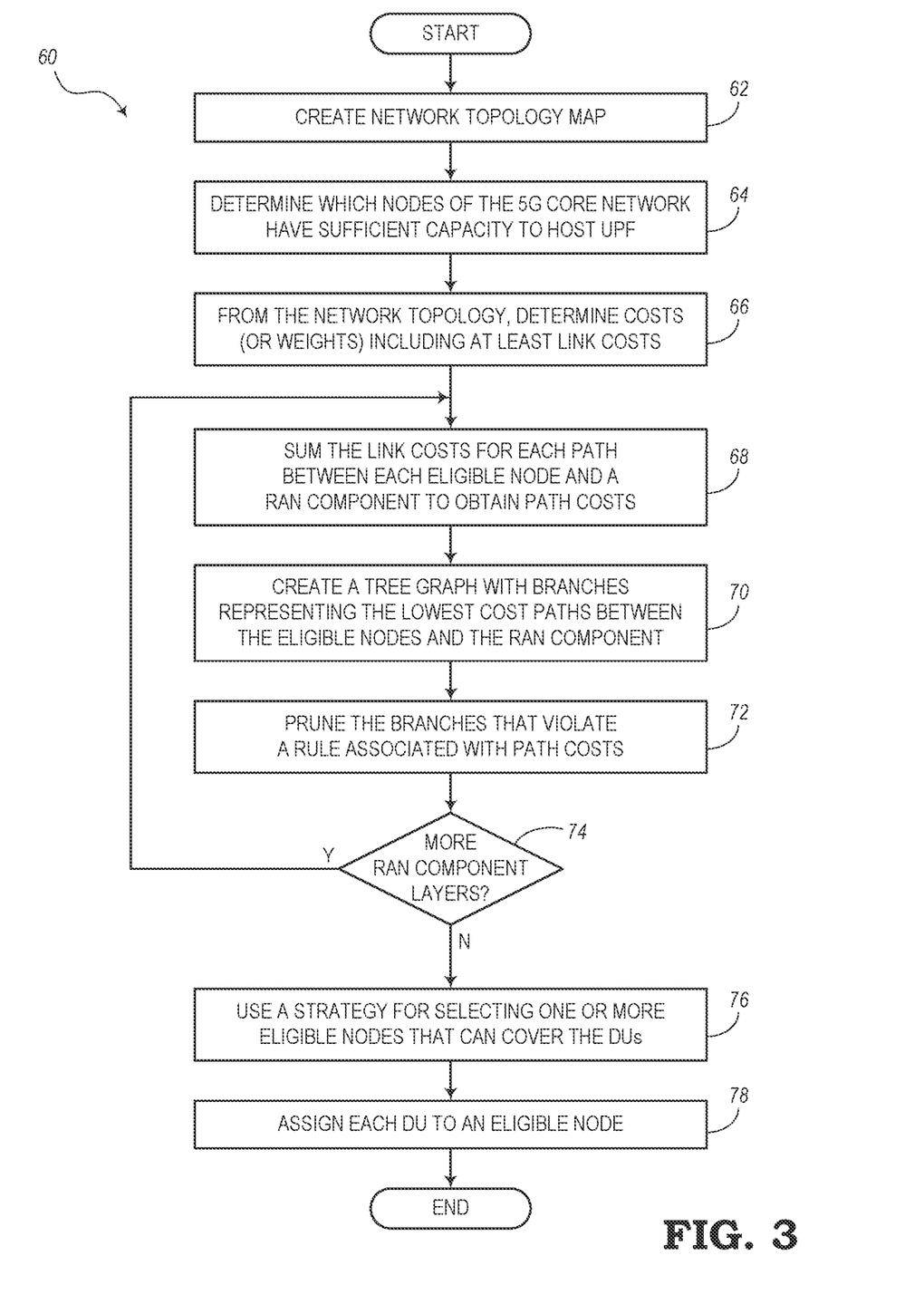
FIG. 3 is a flow diagram illustrating an embodiment of a process for placing UPFs on eligible nodes and assigning the UPFs to cover the DUs of a RAN.

FIG. 3 is a flow diagram illustrating an embodiment of a process 60 for placing UPFs on eligible nodes and assigning the UPFs to cover the DUs of a RAN. As shown in this embodiment, the process 60 includes the step of creating a network topology map (or "scenario graph"), as indicated in block 62. The network topology map may include DUs, CUs, gNBs (e.g., of 5G RANs), along with nodes (e.g., of a data network, data centers, network domains, autonomous systems, etc.). The network topology map may also include connections to the Internet, Intranets, or other WANs. In one example, a logical network topology map, which may be generated, obtained, or created in associated with block 62, is shown in a simplified manner in FIG. 4. At this point, all nodes and links are under consideration as viable nodes and links for UPF placement.

Figure 4:
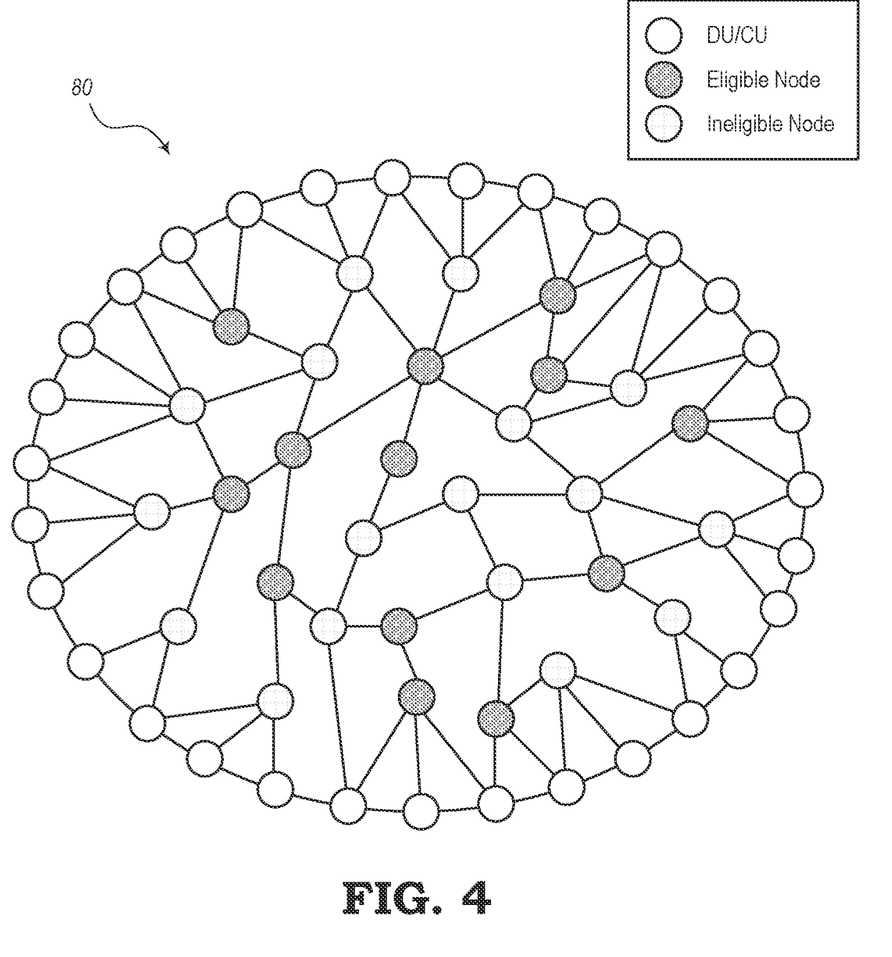
FIG. 4 is a diagram illustrating the network topology of an example 5G core network.

Furthermore, the process 60 includes the step of determining which (intermediate) nodes of a 5G Core Network (CN) have sufficient capacity to host the UPF, as indicated in block 64. This step (block 64) may include distinguishing "eligible" nodes (i.e., those that have sufficient capacity) from "ineligible" nodes (i.e., those that do not have sufficient capacity). As shown in FIG. 4, the DUs and/or CUs are shown as white nodes, the eligible nodes are darkly-shaded green, and the ineligible nodes are lightly-shaded orange. The term "capacity" in this context may represent a node's processing availability and/or memory availability, such as the amount of availability that might be needed to perform the specific UPF. It should be noted that the ineligible nodes are not removed from the topology but may merely be disregarded as candidates for receiving the UPFs. Thus, paths through the ineligible nodes are still recognized as being valid.

Figure 7:
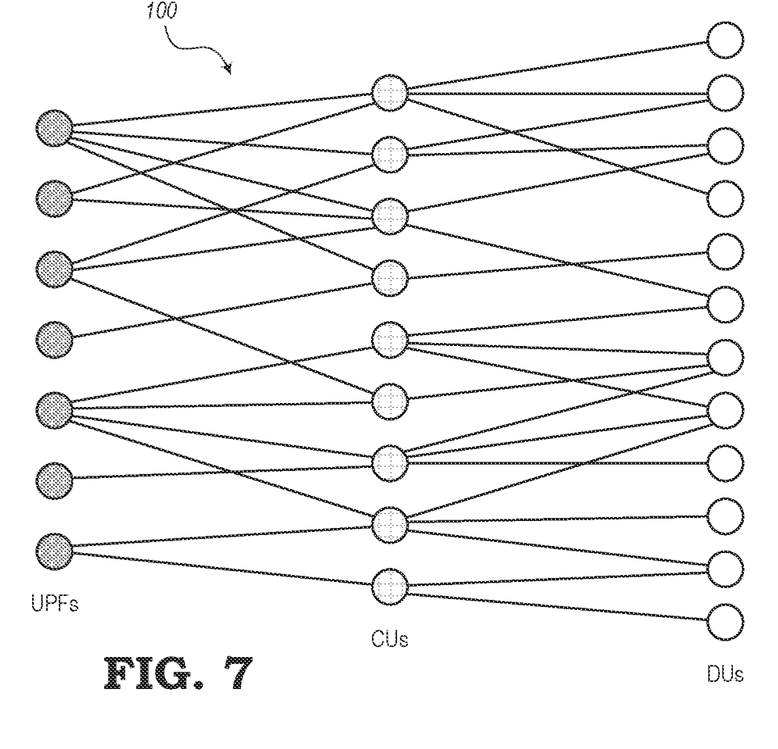
FIG. 7 is a diagram illustrating a solution graph, the result computed by the probabilistic heuristic algorithm.

Next, from the network topology (or scenario graph), the process 60 includes the step of determining the costs (or weights) associated with the nodes and/or links within the network. At this point, all of the eligible nodes are still under consideration for eligibility as UPF nodes. A link cost, for instance, is determined for each link that joins any pair of adjacent nodes, which may include user-to-DU links, DU-to-CU links, CU-to-node links, node-to-node links, node-to-Internet links, etc. It may be noted that in order to simplify the strategies for processing link costs, some of the embodiments of the present disclosure may simply consider only the DU-to-CU links and CU-to-node links. The link costs may be related to a latency cost for transmitting over the respective link. For example, FIG. 7 shows the link costs (or latency) along various links in a slice of the network.

Figure 5:
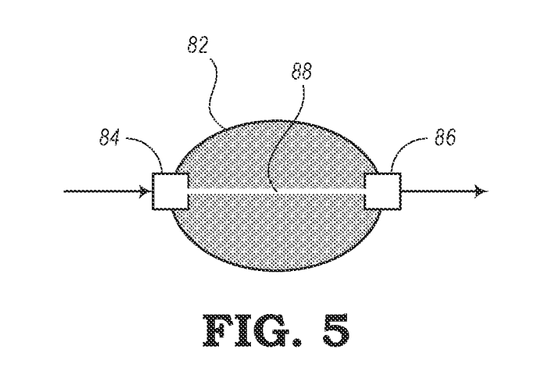
FIG. 5 is a diagram illustrating an example of adding computing time latency to a node shown in the network topology of FIG. 5.

Other costs and/or weights may also be determined or calculated within the network topology map. For example, a computing cost (e.g., associated with the cost for performing the UPF on a node) may also be determined for each eligible node. As shown in FIG. 5, this computing cost 88 can be added into the network topology map for assisting with the calculation of total costs along the various paths that include multiple nodes and links.

Furthermore, the process 60 also includes the step of summing the link costs for each path between each eligible node and a RAN component (e.g., DU or CU), as indicated in block 68. The sum is calculated in order to obtain a "path cost," which may include multiple link costs and may further include the computing cost 88. The computing cost 88, for example, may be translated to a value that can be equated to latency costs or other factors that might be used in associated with the link (latency) costs.

The process 60 also includes the step of creating a tree graph (or "optimization graph"), as indicated in block 70. An example of a tree graph (or optimization graph) is shown in FIG. 7. The tree graph may include branches representing the lowest cost paths between each of the eligible nodes and a corresponding RAN component. Thus, at this point, the eligible nodes still remain as candidates for UPF placement, but, at the same time, the paths that are not the lowest cost paths (e.g., not the shortest paths) are removed from consideration.

Furthermore, the process 60 includes the step of pruning the branches that violate a rule associated with the path costs, as indicated in block 72. In some embodiments, the steps of blocks 70 and 72 may essentially be executed in one step. Regarding the rules associated with path costs, for example, certain paths may be eliminated from UPF consideration if the latency exceeds a predetermined upper limit, if the number of hops exceeds a predetermined upper limit, if the total costs or weights (based on link costs and/or computing costs) exceed a predetermined upper limit, etc. At this point, some branches may be eliminated from consideration. Also, the removal of branches may also lead to the elimination of one or more eligible nodes from UPF placement consideration if no viable corresponding branches (or paths) are left for the node.

Figure 8:
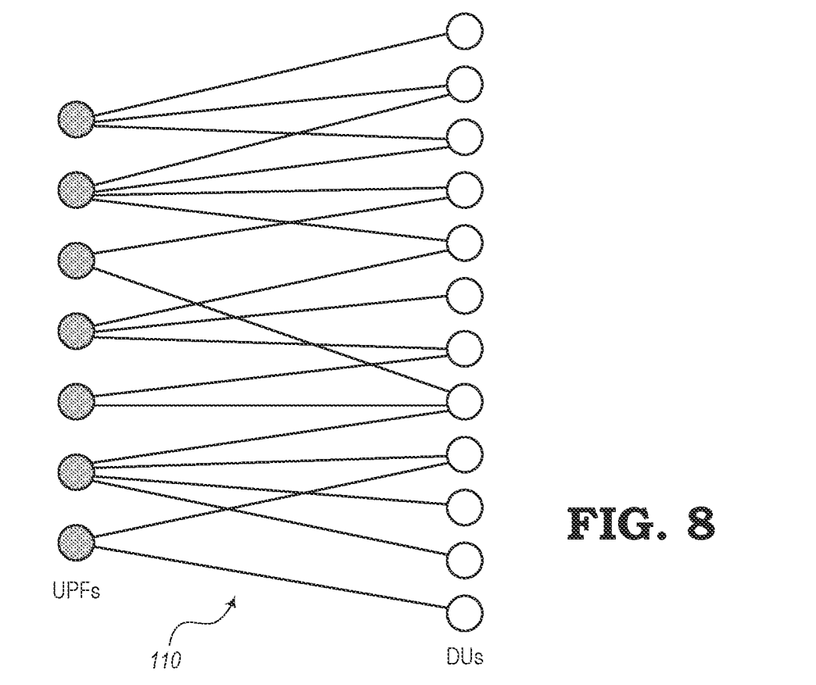
FIG. 8 is a diagram illustrating an example of tree structures in the optimization graph.

In some embodiments, the process 60 may run through the steps in a single pass, such as if a single tree graph or optimization graph is created between the eligible UPF nodes the DUs, as shown in FIG. 8. However, in the case where first and second optimization graphs are created, as depicted in FIG. 7, then the process 60 may repeat blocks 68, 70, 72. For example, the first run may produce the branches between the UPFs and CUs, and the second run may produce the branches between the CUs and the DUs. Thus, depending on the specific implementations, the process 60 may (1) produce a two-part optimization graph, such as the one shown in FIG. 7, which can then be processed further to create a single optimization graph similar to the configuration of the one shown in FIG. 8, and/or (2) produce a single optimization graph, such as the one shown in FIG. 8. Therefore, to allow the process 60 to repeat the steps related to blocks 68, 70, 72, the process 60 includes the step of determining whether there is another layer of RAN components, as indicated in decision diamond 74. If so, the process 60 loops back to block 68. If not, the process proceeds to block 76.

Next, the process 60 includes the step of using any suitable strategy or group of one or more algorithms or techniques for selecting one or more eligible nodes that can cover the DUs, as indicated in block 76. In this sense, the term "covering" may refer to the concept of ensuring that each DU in the network can be adequately represented by at least one UPF. In some cases, this may include eliminating eligible nodes that may be redundant. In one example, this step (block 76) may include proceeding from the optimization graph of FIG. 8 to a solution graph 120 as shown in FIG. 9, where, in this example, two eligible nodes are eliminated since the coverage can be handled by the other eligible nodes.

Figure 9:
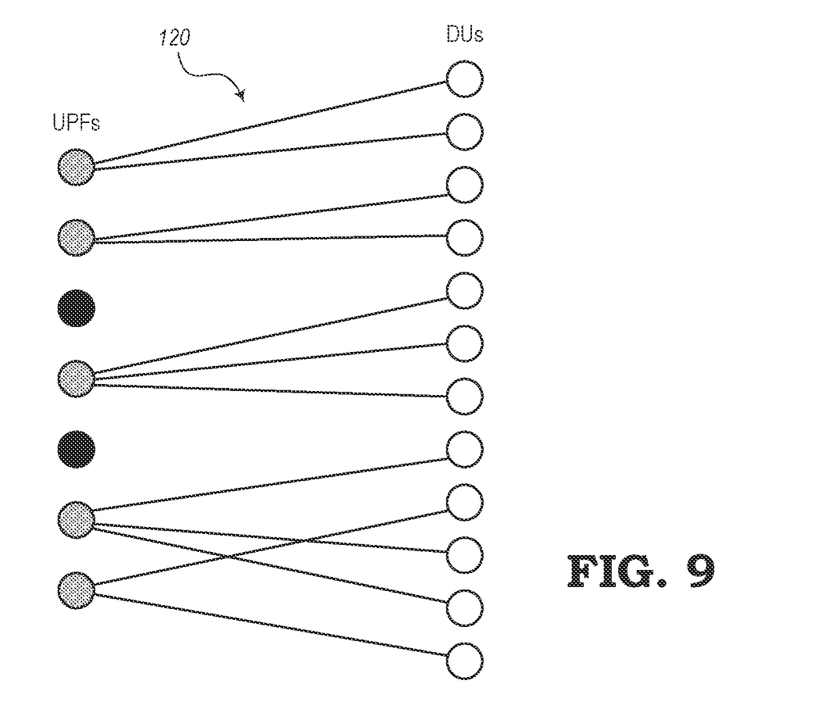
FIG. 9 is a diagram illustrating an example of revised tree structures resulting from a pruning step in the optimization graph.

The process 60 further includes the step of assigning each of the DUs to one of the remaining nodes (e.g., the UPF nodes shown in FIG. 9). The assignment of DUs to UPF nodes may include any suitable strategies. For example, one strategy may include equally distributing the load on each remaining node. As shown in FIG. 9, for instance, the assignment process includes distributing the loads whereby each UPF node is responsible for providing UPF service to two or three DUs, so as not to overload any one UPF node. Another strategy may include minimizing the total costs of the entire network by calculating the cost of each remaining branch and distributing the load to obtain the lowest cost. This second strategy may also include minimizing costs while also ensuring that no UPF node is overloaded.

The VNF (or UPF) placement may include blocks 66, 68, 70, 72 of the process 60. From a logical view of network resources (e.g., FIG. 4, FIG. 7, etc.), the VNF assignment algorithm may first run a shortest path algorithm on the logical network topology, where the link weights are latencies. Using latency weights, the paths (or branches of the tree) in the network can be pruned (block 72) if they exceed the latency required for VNF placement and/or if they do not meet the requirements of the 5G network slice. Once the end-to-end connectivity is determined and the tree graph (or optimization graph) is obtained (e.g., FIG. 7, FIG. 8, etc.). The tree graph may be configured as a bipartite graph with one type of node (e.g., UPF) on one side and another type of node (e.g., DU) on the other side (e.g., as shown in FIG. 8). FIG. 7 is also a two-part bipartite graph in which UPF/CU branches form the first part of the graph and CU/DU branches form a second part. At this point, a valid link exists between a UPF eligible node and a DU node if the path or branch has sufficiently low latency.

The creation of a tree graph (or solution graph) may include blocks 76, 78 and may include assigning DU nodes to UPF eligible locations. This can be done by observing that the problem on the bipartite graph may be viewed as a minimum set cover problem, where suitable strategies may include organizing the UPF nodes into sets to cover all DU nodes, but such that the total cost of all of the nodes might be minimized. It may be noted that if the cost of every UPF eligible node is the same, then the problem may include a strategy of minimizing the number of UPF eligible nodes required to instantiate the 5G network slice.

FIG. 4 is a diagram illustrating a network topology map 80 (or "scenario graph") of a slice, domain, or subnetwork of an example 5G core network. The network topology map 80 includes a logical view of network resources of the 5G core network. In some embodiments, the computing device 40 may use any suitable software programs for keeping track of network resources, which may be incorporated in the computing device 40 or work in conjunction with the UPF placement and assignment program 54. The related software, programs, and/or applications may be configured for inventory orchestration, route analysis, route optimization, service orchestration, etc. With the knowledge from these related applications, the UPF placement and assignment program 54 may use various policies to decide which hardware/network resources can be used for placement, as described herein. Also, the programs may use policies to determine which DUs are required in a network, eliminate those that are not required, and/or use a prioritization scoring to provide more advanced UPF placement for higher priority DUs. The DUs may be those based on monitored 5G slices, tracking areas (TAs), user locations, geofencing, etc. The programs can decide if a hardware/network resource can support a service in terms of the bandwidth, computing, and memory requirements.

Also, in some embodiments, the group of programs and applications (e.g., UPF placement and assignment program 54) may also be configured to determine the set of eligible computing and network resources through a query. The program and applications may be configured to encode the results of the query in an easy to consume format, such as using the tables and graphs similar to those shown in the drawings of the present disclosure.

FIG. 5 is a diagram illustrating an example of adding a computing time latency value to a links, which may include one of the eligible nodes shown in the network topology map 80 of FIG. 5. The node 82 may include an input port 84 and an output port 86. Schematically, the node 82 may be entered in the topology graph as having a "link cost" or computing cost 88 for enabling the processes to consider the costs related to placement of the UPF in the node 82. As such, there is a cost to hosting a VNF at the node 82 and a cost to using the network links via the ports 84, 86. The computing cost 88 corresponds to the cost of using the resources and can be decided based on hourly cost in dollars (e.g., $1 per hour).

In some embodiments, the UE may have a Quality of Service (QoS) or Quality of Experience (QoE) that is required, which may be dependent on acceptable latency thresholds. For example, UE in an Ultra-Reliable Low-Latency Communication (URLLC) network slice, such as a system including multiple self-driving vehicles, may require a much lower latency than UE in a broadband slice. The latency may be calculated from the Internet to the UE. In some embodiments, latency across the software components may be constant. As such, the systems and methods of the present disclosure may focus on the latency across network links to find the best routing and placement assignments. The latency across compute nodes (e.g., node 82) can be added to the model by replacing the node 82 with two new nodes (e.g., ports 84, 86) and connecting them with a latency (e.g., computing cost 88) corresponding to the computing time at the node.

Figure 6:
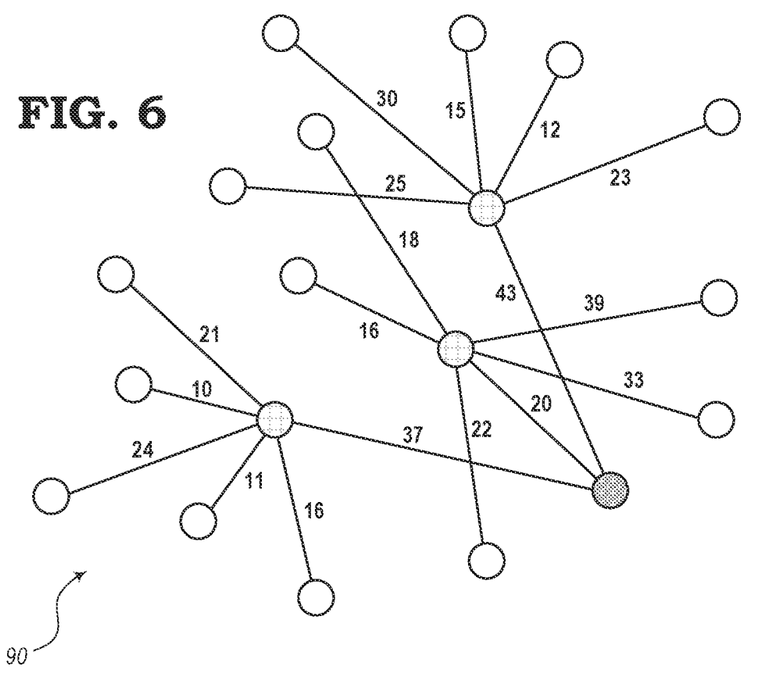
FIG. 6 is a diagram illustrating an optimization graph, the middle stage between an original graph and solution graph (FIG. 7).

FIG. 6 is a diagram illustrating the optimization graph, the middle stage between an original graph and solution graph (FIG. 7). FIG. 7 is a diagram illustrating a solution graph, the result computed by the probabilistic heuristic algorithm. There are three stages: 1. Scenario graph stage, 2. Optimization graph stage, and 3. Solution graph stage. From the full graph (e.g., FIGS. 4 and 6) to the optimization graphs (e.g., FIGS. 7 and 8), the process 60 is configured to omit ineligible long computing costs and/or long latency links. The path will be omitted if the total latency value of all links on this path exceeds the maximum latency value that user sets up. Might be omitted if the total cost of all nodes on the path exceeds the cost value that user sets up as well. In some embodiments, the intermediate optimization graphs may be shown to a network operator while in other embodiments, the optimization graphs may be hidden. It may be noted that the network operator may enter preferences or requirements that may be used to create the optimization graphs.

Each shortest-path tree corresponds to one UPF and the potential DUs that it can serve, which may have polynomial complexity. The distance of each node from the root may be the minimum latency to that node. The process 60 may prune (block 72) the eligible nodes for which latency cannot be met from the root. Coalescing of the trees may be equivalent to the minimum set cover problem. Different solutions (e.g., polynomial-time greedy heuristics) may produce different options for deployment. The processes may include selecting the arcs in the graphs where (1) all DUs are covered and (2) the total cost of arcs is minimized. The graphs can be modified to set weights on links (as shown in FIG. 6) and/or set weights on the eligible nodes (as shown in FIG. 5). Also, the graphs can be modified to minimize the total number of eligible nodes that are used to host the UPFs. The algorithms used herein may be solvable with:

1. Heuristics (e.g., minimum set cover),
2. The Dijkstra's algorithm+minimum set cover/probabilistic heuristic algorithm. for minimizing total link cost,
3. Minimum cost flow optimizations to minimize total number of UPFs, etc.

FIG. 8 is a diagram illustrating an example of tree structures resulting from a combination of the two stages of FIG. 7 or from a single run-through of the process 60 of FIG. 3. FIG. 9 is a diagram illustrating an example of revised tree structures resulting from the selecting and assigning steps (blocks 76, 78) of the process 60 of FIG. 3.

Figure 10:
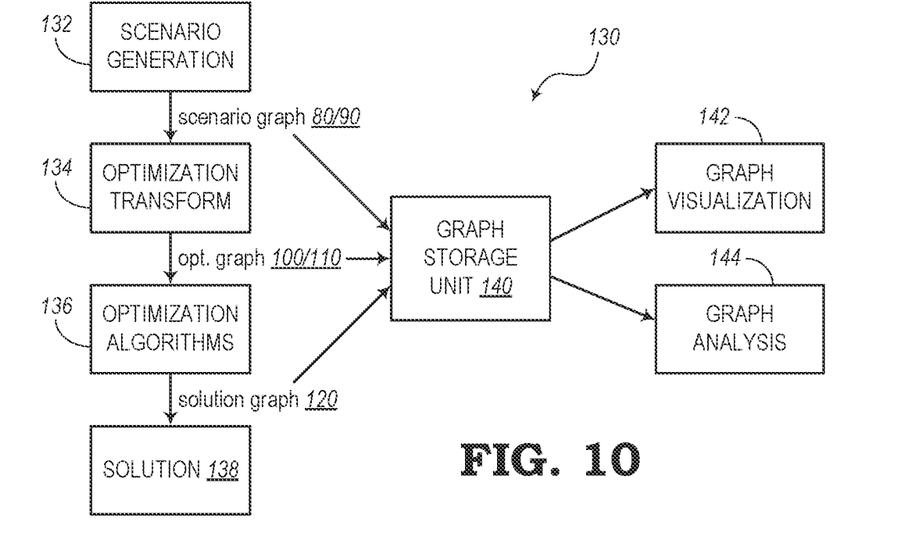
FIG. 10 is a diagram illustrating an embodiment of a testbed architecture related to graph analysis.
Figure 11:
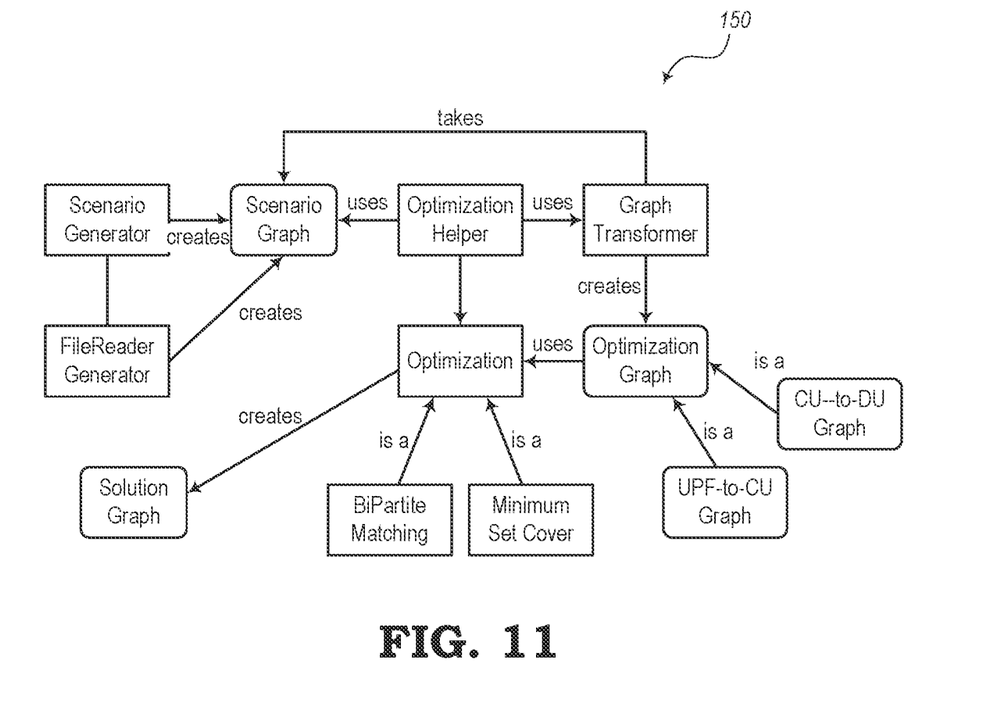
FIG. 11 is a diagram illustrating class/object relationships associated with the processes of the present disclosure.

FIG. 10 is a diagram illustrating an embodiment of a testbed architecture 130 related to graph analysis. Also, FIG. 11 is a diagram illustrating class/object relationships 150 associated with the processes of the present disclosure, such as those related to the testbed architecture 130 of FIG. 10. The testbed architecture 130 includes a scenario generation block 132, an optimization transform block 134, an optimization algorithms block 136, and a solution block 138. The scenario generation block 132 is configured to generate the scenario graph 80, 90. The optimization transform block 134 uses the scenario graph 80, 90 and generates the optimization graph 100, 110. The optimization algorithms block 136 uses the optimization graph 100, 110 and generates the solution graph 120.

The testbed architecture 130 further includes a graph storage unit 140, a graph visualization block 142, and a graph analysis block 144. The graph storage unit 140 is configured to receive the graphs 80, 90, 100, 110, 120 and/or other intermediate or final graphs. The graph visualization block 142 may be configured to access the graphs 80, 90, 100, 110, 120 saved in the graph storage unit 140 and generate the graphs on a user interface (e.g., I/O interfaces 46), such as a Graphical User Interface (GUI) for displaying the graphs for viewing by the network operator, as needed or desired. The graph analysis block 144 is configured to analyze the graphs 80, 90, 100, 110, 120 and related information saved in the graph storage unit 140 for allowing progression from one graph to the next according to the processes described in the present disclosure.

Figure 12:
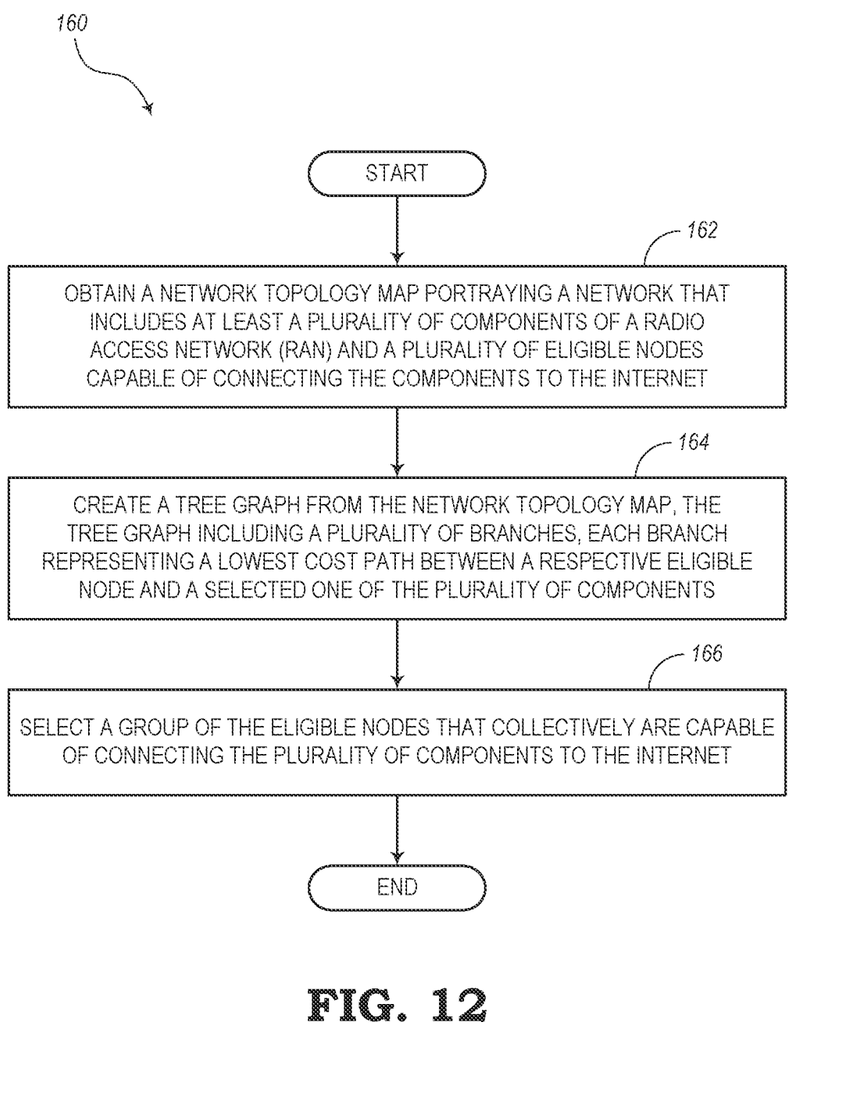
FIG. 12 is a flow diagram illustrating a generalized process for assigning UPFs to DUs.

FIG. 12 is a flow diagram illustrating a process 160, which is a generalized process for assigning UPFs to DUs. In this implementations, the process 160 includes obtaining a network topology map portraying a network that includes at least a plurality of components of a Radio Access Network (RAN) and a plurality of eligible nodes capable of connecting the components to the Internet, as indicated in block 162. Also, the process 160 includes creating a tree graph from the network topology map, as indicated in block 164. The tree graph includes a plurality of branches, where each branch represents the lowest cost path between a respective eligible node and a selected one of the plurality of components. Also, the process 160 includes selecting a group of the eligible nodes that collectively are capable of connecting the plurality of components to the Internet, as indicated in block 166.

According to additional (more detailed) embodiments of the process 160, the process 160 may further include determining which nodes have sufficient capacity to host a User Plane Function (UPF) for enabling connection to the Internet, which may be determined from the plurality of nodes of one or more data network domains connected between the RAN and Internet. The step of determining which nodes have sufficient capacity may include the step of analyzing the processing and/or storage capacity of each of the plurality of nodes.

From the network topology map, the process 160 may also include determining link costs of each of a plurality of communication links in the network topology. The process 160 may also sum the link costs for each path between each eligible node and the selected component to obtain path costs from which the lowest cost paths are derived. Furthermore, the process 160 may include a) calculating a compute cost of each eligible node, b) translating the compute cost into a compute time latency, and c) summing the link costs and compute time latency to obtain path costs from which the lowest cost paths are derived.

According to some embodiments, the process 160 may also include the step of pruning one or more of the plurality of branches of the tree graph that violate a rule associated with a predetermined maximum path cost. The step of creating the tree graph (block 164) may include the steps of a) creating a first set of sub-branches from the eligible nodes to one or more Centralized Units (CUs) of the RAN, b) creating a second set of sub-branches from the one or more CUs to a plurality of Distributed Units (DUs) of the RAN, and c) combining the first and second sets of sub-branches to obtain the plurality of branches to be introduced in the tree graph.

The step of selecting the group of the eligible nodes that collectively are capable of connecting the plurality of components to the Internet (block 166) may also include a minimum set cover technique, a probabilistic heuristic technique, and/or other techniques. For example, the minimum set cover technique and probabilistic heuristic technique may be configured to return the fewest possible number of eligible nodes. On top of the smallest number of UPF and CU eligible nodes, the solution also needs to fully satisfy user's input value such as maximum_latency, maximum_cost, etc.

The process 160 may also include the step of assigning each component of the RAN to a node selected from the group of eligible nodes. The step of assigning each component to a node may be configured to distribute a substantially equal load on each node of the group of eligible nodes. Also, or alternatively, the step of assigning each component to a node may be configured to minimize a total cost in the network without overloading any node. In some embodiments, the eligible nodes may be part of a 5G core network, and the components of the RAN include at least a Centralized Unit (CUs) and one or more Distributed Units (DUs). Each of one or more of the lowest cost paths may represent the shortest path between the respective eligible node and the selected one of the plurality of components.

The minimum cover set can be solved using a greedy algorithm. This algorithm can work in iterations, where in each iteration a UPF eligible node is picked and DUs which are not covered by any UPF eligible nodes are assigned to that node. In each iteration, the UPF eligible with the most potential assignments is picked. The DU nodes connected to that UPF eligible node in the bipartite graph create a new set and are removed from future consideration. The algorithm stops when all DU nodes are assigned or no UPF eligible nodes remain or if conditions are not satisfiable.

A randomized version of the algorithm, which can be parallelized over multiple random seeds, also works in iterations. In each iteration, a subset of the best UPF eligible nodes may be picked (e.g., 4 nodes with highest potential) and one of these nodes may be chosen randomly to create a new set. Stopping criteria for this algorithm are the same as above.

Various filtering mechanisms can be added after assigning a UPF eligible node to a DU node. For example, the algorithm can track available bandwidth on each path from a UPF eligible node to a DU node. As DU nodes are assigned, available path bandwidth may be updated. When path bandwidth is fully consumed, the corresponding link in the bipartite graph may be removed so that the DUs using that path cannot be assigned to the UPF anymore.

The algorithm can also be extended to layered networks. For example, for assigning CUs and UPFs to the DUs, the systems and methods can use the algorithms in two stages, such as assigning the DUs to the CUs in a first stage and then assigning the CUs to the UPFs in the second stage. In some implementations, the algorithms, techniques, processes, etc. may be designed to be parallelized.

The procedures, techniques, algorithms, etc. may run in polynomial time. They can run in maximum time where (number of green nodes)*((number of links+number of nodes) squared).

If an eligible node is returned (i.e., depicted as being qualified, eligible, "not rejected," etc.), then it can be determined that it meets latency requirements to all of the DUs in its shortest path tree. This is a property of shortest paths with latency as the weights. As shown in the examples, some DUs may appear in the shortest path tree of more than one returned eligible node. It may be up to the graph analysis block 144, the network operator, or other algorithm, technique, methodology, etc. to make the final mapping.

If a DU does not appear in any returned node's shortest path tree, that DU cannot be served within the latency requirements with the available compute/network capacity. If this is acceptable, such as according to network requirements set by a network operator, then these DU may simply be unavailable for connecting to user devices. Otherwise, sufficient capacity may be added to a nearby node to allow that node to host the UPF.

The cost can be added to each eligible node to reflect the cost of serving a UPF at that node. For example, costs may vary and may be dependent on location, such as if the node is at a higher-cost edge or at a core data center. The algorithms described herein may return (e.g., designate as acceptable, valid, or eligible) the green nodes that minimize the cost.

It has been discovered from research that the systems and methods of the present disclosure are able to scale well as a network grows. This can be done by adding more computing nodes in the network and adding more "eligible" nodes that can handle additional UPF as needed. It was found, for example, that the systems and methods of the present disclosure were able to reduce the amount of time needed to decide, which can be a factor of increasing the number of threads used by the algorithms. In the experimental prototype or setup, it was shown that the present embodiments were able to reduce the amount of time to decide on a 2000 node 5G core network from 530 seconds down to 48 seconds by using 20 threads.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A non-transitory computer-readable medium configured to store computer logic having instructions that, when executed, cause one or more processing devices to perform steps of:
   obtaining a network topology map portraying a network that includes at least a plurality of components of a Radio Access Network (RAN) and a plurality of eligible nodes capable of connecting the plurality of components to the Internet;
   creating a tree graph from the network topology map, the tree graph including a plurality of branches, wherein each branch represents a lowest cost path between a respective eligible node and a selected one of the plurality of components; and
   selecting a group of the eligible nodes that collectively are capable of connecting the plurality of components to the Internet, wherein selecting the group includes filtering candidate nodes based on sufficient processing and storage capacity to host a User Plane Function (UPF), computing a compute cost for each candidate node, translating the compute cost into a compute latency, and summing the compute latency with link-path costs to obtain cumulative path costs for tree construction and selection.

2. The non-transitory computer-readable medium of claim 1, wherein the steps further include
   determining which candidate nodes of the plurality of nodes are eligible to host a UPF based on combined processing capacity, storage capacity, and latency requirements.

3. The non-transitory computer-readable medium of claim 2, wherein the steps further include
analyzing both processing availability and storage availability of each candidate node and filtering out ineligible nodes for UPF placement while retaining them for path traversal.

4. The non-transitory computer-readable medium of claim 1, wherein the steps further include
determining link costs of each of a plurality of communication links in the network topology from the network topology map.

5. The non-transitory computer-readable medium of claim 4, wherein the steps further include
summing the link costs for each path between each eligible node and selected component to obtain path costs from which the lowest cost paths are derived.

6. The non-transitory computer-readable medium of claim 4, wherein the steps further include
calculating a compute cost of each eligible node;
translating the compute cost into a compute time latency; and
summing the link costs and compute time latency to obtain path costs from which the lowest cost paths are derived, wherein the compute time latency represents additional delay incurred by instantiating a UPF at the eligible node.

7. The non-transitory computer-readable medium of claim 1, wherein the steps further include
pruning one or more of the plurality of branches of the tree graph that violate a rule associated with a predetermined maximum path cost, such that branches are removed when cumulative compute latency and link costs exceed a threshold or when node capacity would be exceeded.

8. The non-transitory computer-readable medium of claim 1, wherein the step of creating the tree graph includes the steps of
creating a first set of sub-branches from the eligible nodes to one or more Centralized Units (CUs) of the RAN;
creating a second set of sub-branches from the one or more CUs to a plurality of Distributed Units (DUs) of the RAN; and
combining the first and second sets of sub-branches to obtain the plurality of branches to be introduced in the tree graph, thereby generating a hierarchical assignment structure distinguishing CU-to-DU and UPF-to-CU sub-paths.

9. The non-transitory computer-readable medium of claim 1, wherein the step of selecting the group of the eligible nodes that collectively are capable of connecting the plurality of components to the Internet includes one or more of a minimum set cover technique and a probabilistic heuristic technique.

10. The non-transitory computer-readable medium of claim 9, wherein the one or more of the minimum set cover technique and probabilistic heuristic technique are configured to return a fewest possible number of eligible nodes, while ensuring that load distribution and latency requirements are satisfied.

11. The non-transitory computer-readable medium of claim 1, wherein the steps further include
assigning each component of the RAN to a node selected from the group of eligible nodes, such that each DU is assigned to a UPF-hosting node that satisfies capacity and latency constraints.

12. The non-transitory computer-readable medium of claim 11, wherein the step of assigning each component to a node is configured to distribute a substantially equal load on each node of the group of eligible nodes.

13. The non-transitory computer-readable medium of claim 11, wherein the step of assigning each component to a node is configured to minimize a total cost in the network without overloading any node, where total cost includes both link costs and compute time latencies.

14. The non-transitory computer-readable medium of claim 1, wherein the eligible nodes are part of a 5G core network, and the components of the RAN include at least a Centralized Unit (CUs) and one or more Distributed Units (DUs).

15. The non-transitory computer-readable medium of claim 1, wherein each of one or more of the lowest cost paths represent a shortest path between the respective eligible node and the selected one of the plurality of components.

16. A method comprising steps of:
obtaining a network topology map portraying a network that includes at least a plurality of components of a Radio Access Network (RAN) and a plurality of eligible nodes capable of connecting the plurality of components to the Internet;
creating a tree graph from the network topology map, the tree graph including a plurality of branches, wherein each branch represents a lowest cost path between a respective eligible node and a selected one of the plurality of components; and
selecting a group of the eligible nodes that collectively are capable of connecting the plurality of components to the Internet, wherein selecting includes computing compute costs, translating compute costs to compute latencies, summing the latencies with link costs to obtain cumulative path costs, and pruning branches exceeding latency or capacity thresholds.

17. The method of claim 16, wherein the steps further include
determining link costs of each of a plurality of communication links in the network topology; and
summing the link costs together with compute time latencies of candidate UPF-hosting nodes for each path between each eligible node and the selected component to obtain path costs from which the lowest cost paths are derived.

18. The method of claim 16, wherein the steps further include
pruning one or more of the plurality of branches of the tree graph that violate a rule associated with a predetermined maximum path cost; and
assigning each component of the RAN to a node selected from the group of eligible nodes, such that assignment minimizes cumulative cost or balances load while preventing overload of any node.

19. A processing device comprising:
one or more processors and memory storing instructions that, when executed, cause the one or more processors to
obtain a network topology map portraying a network that includes at least a plurality of components of a Radio Access Network (RAN) and a plurality of eligible nodes capable of connecting the plurality of components to the Internet,
create a tree graph from the network topology map, the tree graph including a plurality of branches, wherein each branch represents a lowest cost path between a respective eligible node and a selected one of the plurality of components, and select a group of the eligible nodes that collectively are capable of connecting the plurality of components to the Internet, wherein selection includes computing compute latencies for candidate nodes, summing compute latencies with link costs to obtain cumulative path costs, and assigning RAN components to elected nodes to minimize cost or balance load subject to capacity constraints.

20. The processing device of claim 19, wherein the instructions that, when executed, further cause the one or more processors to
   determine link costs of each of a plurality of communication links in the network topology, and
   sum the link costs and compute latencies for each path between each eligible node and the selected component to obtain path costs from which the lowest cost paths are derived.

* * * * *